July 5, 1949.  A. WELLMAN  2,475,343
CONTROL SYSTEM
Filed Aug. 17, 1946
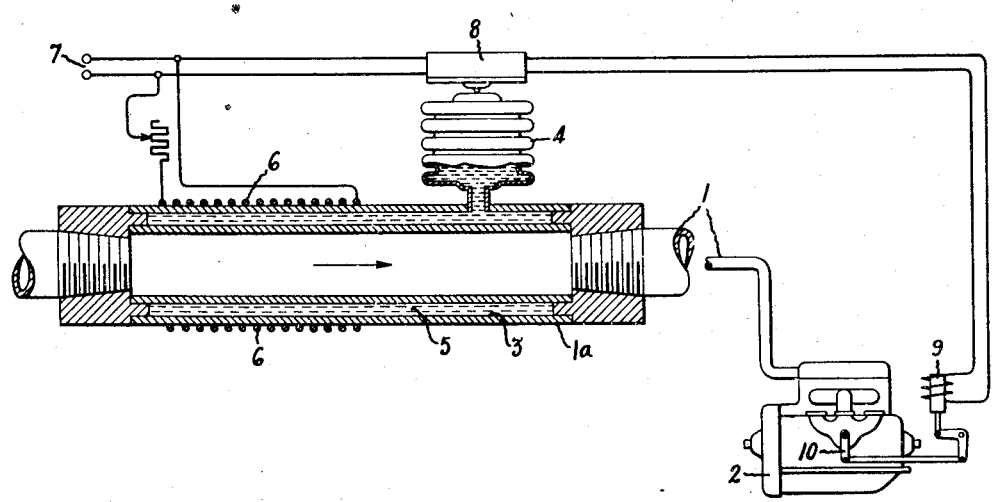
Inventor:
Albert Wellman,
by Claude ?. ?
His Attorney.

Patented July 5, 1949

2,475,343

UNITED STATES PATENT OFFICE 2,475,343

CONTROL SYSTEM

Albert Wellman, Schenectady, N. Y., assignor to General Electric Company, a corporation of New York Application August 17, 1946, Serial No. 691,271

4 Claims. (Cl. 123—198)

My invention relates to control systems, and more particularly to flow and temperature control systems and apparatus especially applicable to fluid cooling systems and the like.

In fluid cooling systems for energy translating apparatus, such as internal combustion engines and the like, it is desirable to protect the cooling system against both failure of fluid flow and excessive temperature of the cooling fluid. Since either or both of these conditions ordinarily require shut down of the translating apparatus, it is preferable to provide a single protective device responsive both to cooling fluid temperature and flow.

Accordingly, it is a general object of my invention to provide a new and improved control system for a fluid cooling apparatus and the like.

It is a further object of my invention to provide a new and improved protective system and apparatus for fluid flow systems, responsive both to variation in the volume of fluid flow and variation in fluid temperature.

In accordance with my invention, a response to both the volume of flow and temperature of fluid flowing through a conduit is provided by a thermal-responsive device arranged to be cooled by fluid passing through the conduit and simultaneously to be heated at a fixed rate from a separate source of heat supply. Thus, under normal conditions of fluid flow, the thermal-responsive device will be maintained within a predetermined normal temperature range determined by the normal limits of fluid flow and temperature. If, however, the fluid in the conduit either increases in temperature beyond a predetermined limit or decreases in volume of flow below a predetermined limit, the heat balance is upset, and the resultant action of the thermal-responsive device may be utilized to carry out either an indicating or a control function. Manifestly, of course, my invention contemplates not only using the fluid in the conduit to cool the thermal-responsive device and an external source to heat the device, but also utilizing the fluid in the conduit to heat the thermal-responsive device in conjunction with an external means for cooling the device at a fixed rate.

My invention will be more fully understood and its various objects and advantages further appreciated by referring now to the following detailed specification taken in conjunction with the accompanying drawing, the single figure of which is a schematic diagram of a fluid cooling system and apparatus embodying my invention.

Referring now to the drawing, I have there shown for the purpose of illustration only, one embodiment of my invention in which cooling fluid is supplied through a conduit 1 to an internal combustion engine 2. The conduit 1 includes a section 1a provided with a liquid-tight jacket 3. The jacket 3 is connected with a bellows or other expansible container 4. The jacket 3 and bellows 4 are filled with a thermally-expansible liquid 5. Out side the jacket 3 and surrounding it and the conduit section 1a is an electric-heating coil 6 suitably connected to a source of electric current supply 7.

While it will, of course, be understood that expansion and contraction of the bellows 4 may be utilized to effect either an indicating or a controlling function, I have illustrated in the drawing a system wherein the bellows 4 actuates a switch 8 connected to control the operation of the internal combustion engine 2. For this purpose, I have illustrated schematically a solenoid 9 connected to a shut-off valve 10 on the internal combustion engine and connected to be energized through the switch 8.

It will now be evident from the foregoing description that, in operation, the thermally-expansible liquid 5 contained in the jacket 3 and the bellows 4 is heated at a fixed rate by the electric-heating coil 6. Simultaneously, the expansible liquid 5 is cooled by fluid normally flowing continuously through the conduit section 1a. So long as the volume and temperature of the fluid passing through the conduit section 1a remain within predetermined limits, the expansible liquid 5 is also maintained within a predetermined temperature range. Within this normal temperature range the switch 8 is not actuated to shut down the internal combustion engine 2. If, however, the flow of fluid in the conduit section 1a is interrupted or reduced appreciably, or if the temperature of the fluid flowing in the conduit section 1a becomes too great, its cooling effect upon the expansible liquid 5 is insufficient to maintain the liquid 5 within its normal temperature range. Under any of these circumstances, the switch 8 is actuated and controls the solenoid 9 to close the engine shut-off valve 10.

While I have shown and described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States, is:

1. A protective device for an energy translating apparatus including a cooling system and a shutdown control means comprising, a fluid conduit arranged normally to carry a continuous flow of fluid for cooling said apparatus, thermal responsive means in heat conductive relation with said fluid adapted to actuate said shutdown control means, and heating means arranged to heat said thermal responsive means continuously at a fixed rate, whereby under normal flow conditions heat added to said thermal responsive means by said heating means is carried away by said cooling fluid.

2. In a flow control system, a fluid conduit having a section provided with a liquid-tight jacket, an expansible container connected to said jacket, a thermally expansible liquid filling said jacket and container, and electric heating means surrounding said jack and in heat conducting relation with said liquid.

3. In a system for cooling energy translating apparatus the combination comprising a fluid conduit arranged normally to carry a continuous flow of cooling fluid, said conduit including a section provided with a fluid-tight jacket, a thermal-responsive liquid in said jacket adapted to be cooled by fluid in said conduit, means for supplying heat to said thermal-responsive liquid at a fixed rate, and means actuated by said thermal-responsive liquid to interrupt the operation of said translating apparatus.

4. In a flow control system, a fluid conduit arranged normally to carry a continuous flow of fluid, said conduit including a section provided with a liquid-containing jacket, a thermally expansible liquid in said jacket, heating means positioned in heat-conductive relation with said expansible liquid, and control means actuated by said thermally expansible liquid.

ALBERT WELLMAN.

REFERENCES CITED

The following references are of record in the file of this patent:

UNITED STATES PATENTS

| Number | Name | Date |
| --- | --- | --- |
| 828,262 | Adams | Aug. 7, 1906 |
| 978,983 | Brent | Dec. 20, 1910 |
| 1,246,799 | Wilson | Nov. 13, 1917 |
| 1,823,397 | Guy | Sept. 15, 1931 |
| 1,968,828 | Hardison | Aug. 7, 1934 |
| 2,010,960 | Pogue | Aug. 13, 1935 |
| 2,300,418 | Hall | Nov. 3, 1942 |
| 2,304,211 | Sparrow | Dec. 8, 1942 |
| 2,319,005 | Lum | May 11, 1943 |
| 2,344,946 | Landon | Mar. 28, 1944 |